Patented Sept. 25, 1945

2,385,359

UNITED STATES PATENT OFFICE 2,385,359

CELLULOSE ETHER COMPOSITION

Melvin J. Hunter and Earle L. Kropscott, Midland, Mich., assignors to The Dow Chemical Company, Midland, Mich., a corporation of Michigan No Drawing. Application November 27, 1942, Serial No. 467,150

7 Claims. (Cl. 106—182)

This invention relates to a cellulose ether composition and more particularly to an ethyl cellulose molding composition having a high degree of flexibility and a high impact resistance at low temperatures.

The utility of molded compositions containing cellulose derivatives is limited in many cases by their lack of flexibility and low impact resistance at low temperatures. Such compositions tend to become brittle and to break or shatter when they are subjected to shock at low temperatures frequently encountered in use. Many plasticizers are effective in improving the flow properties of cellulose derivatives under the application of heat and pressure without detracting unduly from their toughness, but none have heretofore been found which yield molding compositions of value which do not lose their resistance to shock at low temperatures. Although ethyl cellulose is relatively more flexible and tough at lower temperatures than other cellulose derivatives, such as the cellulose esters, molded films, coatings or other structures of the plasticized ethyl cellulose compositions hitherto known are subject to considerable embrittlement at temperatures somewhat below 0° C. Consequently, such compositions are of no value in applications where they are subject to shock at still lower temperature.

It is an object of the present invention to provide a plasticized ethyl cellulose composition which is both flexible and tough at low temperatures.

An additional object is to provide a molded ethyl cellulose structure of high shock resistance at low temperatures.

An additional object is to provide a plasticizer for ethyl cellulose adapted to the preparation therefrom of a plasticized composition of high resistance to shock at low temperatures.

According to the invention, the foregoing and related objects are readily accomplished by employing, as a plasticizer for ethyl cellulose compositions, an alkyl ester of an acid selected from the class consisting of hydroxystearic acids and of acyloxystearic acids wherein the acyloxy group corresponds to a saturated aliphatic acid. In a copending application, Serial No. 415,782, filed by the present inventors October 20, 1941, there are described ethyl cellulose compositions including, as mold lubricants, small proportions, i. e. from 0.5 to 5.0 per cent by weight, of certain of the ester plasticizers with which the present invention is concerned. When used in the small proportions described in the copending application, the herein described advantages of the use of the present esters as plasticizers are not apparent.

It has now been found that when the alkyl esters of hydroxystearic acids or of acyloxystearic acids are incorporated in ethyl cellulose compositions in amounts greater than about 8 per cent, and preferably greater than about 10 per cent, of the weight of the composition they act as plasticizers for the ethyl cellulose. It has been found further that such compositions and structures prepared therefrom not only have a high degree of flexibility and a high impact resistance at ordinary and elevated temperatures but that, unexpectedly, these properties are retained in large degree at very low temperatures. It is thus possible to provide an ethyl cellulose molding composition and molded articles which are of greater value in applications where they are subject to shock at low temperatures than has heretofore been possible with any cellulose derivative composition. Compositions of exceptionally high heat-stability and having flexibility and shock resistance adequate for many purposes at temperatures as low as —70° C. are readily prepared and these compositions may be either injection or extrusion molded as desired. They may also, if desired, be dispersed in a solvent and applied as a lacquer to obtain surface coatings which are flexible and tough at low temperatures.

Ethyl cellulose having an ethoxy content of from 44 to 49.5 per cent may be used conveniently in preparing the composition of the invention although ethyl cellulose of somewhat higher or lower ethoxy content may be used, if desired. Esters which may be used as plasticizers in the composition include the various alkyl esters, e. g. the methyl, ethyl, propyl, n-butyl, sec.-butyl, n-amyl, iso-amyl, hexyl, n-octyl, 2-ethyl-hexyl, decyl and lauryl esters, of the hydroxy- and acyloxystearic acids, such as 12-hydroxystearic acid, 9,10-dihydroxystearic acid, 9,10,12-trihydroxystearic acid, 12-acetoxystearic acid, 9,10-diacetoxystearic acid, 9,10,12-triacetoxystearic acid, 12-propionoxystearic acid and 12-butyroxystearic acid. Alkyl esters which contain from 1 to 10 carbon atoms inclusive in the alkyl group are of particular value although higher or lower esters may be used, if desired. The preparation and properties of certain of the alkyl esters of 12-hydroxystearic acid esters which may be used are described in a copending application Serial No. 463,252 filed October 24, 1942, by one of the present inventors together with Howard N. Fenn.

The alkyl esters of acyloxystearic acids may be prepared readily by acylating the corresponding esters of hydroxystearic acids in conventional manner, e. g. by reacting the ester with the anhydride of a saturated aliphatic acid, or by acylating the corresponding ester of ricinoleic acid and subsequently hydrogenating the acylated ester.

Although the new composition contains 8 per cent or more of the ester plasticizers it should be mentioned that the latter are not compatible in all proportions with ethyl cellulose. They are, however, all compatible therewith in amount sufficient to form useful compositions which have good low temperature flexibility and toughness. It is understood that the ester plasticizers may be used in a compatible amount greater than 8 per cent by weight of the composition, i. e. in amounts of from 8 per cent by weight of the composition up to the limit of their compatibility in the composition. The compatibility limits of a number of the esters with ethyl cellulose of (a) 45.5 per cent ethoxy content and (b) 49.0 per cent ethoxy content are given in Table 1. To determine the compatibility limits of the esters, separate ethyl cellulose foils containing different amounts of each of the esters were cast on glass from a solution thereof in 80 parts by volume of toluene and 20 parts of ethanol. The foils were removed from the glass plates and portions of each were subjected to a series of tests including: (1) exposure to air for 2 hours at —70° C. followed by 2 hours at 70° C.; (2) exposure to air of 50 per cent relative humidity at 21° C. for 1 week, (3) soaking for at least 16 hours in water at 70° C.; and (4) exposure out-of-doors for at least two weeks. The limit of compatibility was expressed as the lowest percentage by weight of the ester in the composition which resulted in any apparent nonhomogeneity in the foil or which caused surface bloom or "sweating" thereon under any of the conditions of the test.

TABLE 1

*Compatibility of plasticizers with ethyl cellulose*

| Plasticizer | Compatibility with ethyl cellulose | |
|---|---|---|
|  | (a) of 45.5 per cent ethoxy content | (b) of 49.0 per cent ethoxy content |
| Methyl 12-hydroxystearate | 16 | 20 |
| n-Butyl 12-hydroxystearate | 30 | 30 |
| Sec.-butyl 12-hydroxystearate | 50 | 50 |
| 2-ethyl-hexyl 12-hydroxystearate | 40 | 40 |
| n-Octyl 12-hydroxystearate | 20 | 20 |
| Methyl 12-acetoxystearate | 35 | 30 |
| Ethyl 12-acetoxystearate | 35 | 35 |
| n-Butyl 12-acetoxystearate | 30 | 35 |
| 2-ethyl-hexyl 12-acetoxystearate | 25 | 35 |

Compositions prepared according to the present invention have a specific gravity lower than that of most ethyl cellulose compositions because of the low density of the ester plasticizer. Compositions may be prepared having a specific gravity of from 1.05 to 1.15. Because of the waxy nature of the new plasticizers and their efficiency as mold lubricants, the addition of mold release agents to the composition is unnecessary. The compositions may be molded in the usual manner, and in the case of extrusion molding operations they may be extruded at temperatures of from 20° to 80° F. lower than most other ethyl cellulose compositions. They are exceptional in their ability to hold dimensions and complicated shapes during extrusion. The compositions possess excellent resistance to weathering and are of value for use out-of-doors, such as for the coating of wire, cables, etc., where they may be subjected to wide variations in temperature and humidity. Transparent formulations will remain clear indefinitely when immersed in water. The low rate of dimensional change with change in temperature of the compositions of the invention in comparison with several other plastic materials is shown in Table 2.

TABLE 2

*Dimensional stability of plastic compositions*

| Plastic | Change in length in inches of a 3.5 inch bar caused by lowering the temperature from 20° (°C.) to— | |
|---|---|---|
|  | —20° (°C.) | —70° (°C.) |
| Ethyl cellulose plasticized with 2-ethyl-hexyl 12-hydroxystearate | .004 | .007 |
| Cellulose acetate | .007 | .010 |
| Cellulose acetate butyrate | .004 | .012 |
| Methyl methacrylate | .004 | .010 |

The new ester plasticizers may be used as the sole modifying agents in ethyl cellulose compositions or they may be used in conjunction with other plasticizers or with resinous modifying agents, pigments, etc. In such compositions the improvement in flexibility and impact resistance of the composition due to the ester plasticizers are maintained at low temperatures.

The following examples illustrate certain advantages of the invention but are not to be construed as limiting:

EXAMPLE 1.—INJECTION MOLDING PLASTIC 85 parts by weight of ethyl cellulose having an ethoxy content of 45.5 per cent, 15 parts of 2-ethyl-hexyl 12-hydroxystearate, and 100 parts of ethanol were compounded together in a kneading type of mixer until a uniform mixture was obtained and the latter then removed from the mixer and dried to remove the ethanol. A second mixture was prepared using 15 parts of n-butyl 12-acetoxystearate instead of the 2-ethyl-hexyl 12-hydroxystearate. These dry materials were easily molded at 410° F. in an extrusion machine and at 425° F. and a pressure of 5000 pounds per square inch in an injection molding press, the molded articles separating readily from the die surfaces in each case without sticking. For comparative purposes a composition was prepared in similar manner containing 85 parts by weight of the same ethyl cellulose and 18 parts of di(o-xenyl) monophenyl phosphate according to United States Patent 2,124,540. The impact resistance of an injection molded sample of the latter composition and of both injection and extrusion molded samples of the composition plasticized with 2-ethyl-hexyl 12-hydroxystearate and of an injection molded sample of the composition plasticized with n-butyl 12-acetoxystearate were compared at temperatures between 20° C. and —70° C. Impact resistance was determined on ¼ x ¼ inch Izod notched bars according to A. S. T. M. Method D 256–41T. The impact resistances are recorded in Table 3 in foot-pounds of energy per inch of notch required to break the test bars.

TABLE 3

*Effect of temperature on impact strength of ethyl cellulose plasticized with (a) 2-ethyl-hexyl 12-hydroxystearate, (b) n-butyl 12-acetoxystearate, and (c) di(o-xenyl)phenyl phosphate*

| Temperature °C. | Impact strength | | | |
|---|---|---|---|---|
| | Composition (a) | | Composition (b) Inj. | Composition (c) Inj. |
| | Inj. | Ext. | | |
| 20 | 3.2 | 4.4 | 3.6 | 3.6 |
| 10 | 2.9 | 4.1 | | 2.2 |
| 0 | 2.7 | 3.6 | | 1.3 |
| −10 | 2.4 | 3.1 | | 0.7 |
| −20 | 2.2 | 2.7 | 2.2 | 0.5 |
| −30 | 1.8 | 2.3 | | 0.4 |
| −40 | 1.5 | 2.0 | | 0.3 |
| −50 | 1.2 | 1.7 | 1.4 | 0.3 |
| −60 | 1.0 | 1.4 | | 0.3 |
| −70 | 0.7 | 1.2 | 0.6 | 0.3 |

EXAMPLE 2.—EXTRUSION MOLDING PLASTIC

A wire coating composition consisting of 25 parts by weight of 2-ethyl-hexyl 12-hydroxystearate and 75 parts of ethyl cellulose having ethoxy content of 46.5 per cent was extruded over 18 gauge tinned copper wire with a Royal No. 1 extruder. A coating 0.01 inch thick was obtained. No cracking resulted when the cotated wire was wrapped around its own diameter at −40° F.

EXAMPLE 3.—CABLE COATING COMPOSITION

A length of cotton braided, rubber covered automobile ignition cable was coated with a composition consisting of 50 parts by weight of ethyl cellulose having an ethoxy content of 46 per cent, 50 parts of Paraplex RG–2 (an alkyd type, non-oxidizing plasticizing resin), 3 parts mineral oil and 200 parts of a solvent consisting of 60 parts by volume of toluene and 40 parts of ethanol. Another length of the same cable was coated with a composition consisting of 50 parts by weight of the same ethyl cellulose, 30 parts of Paraplex RG–2, 20 parts of 2-ethyl-hexyl 12-hydroxystearate, 3 parts mineral oil, and 200 parts of the same solvent. Both lengths of coated cable were thoroughly dried and each was found to have a coating about 0.02 inch thick. They were then placed in a refrigerator at −5° C. for 4 hours and, without removing them from the refrigerator, they were flexed sharply around a cylindrical mandrel ½ inch in diameter. The coating containing the 2-ethyl-hexyl 12-hydroxystearate was not broken or cracked after flexing around the cylinder while the coating which did not contain the 2-ethyl-hexyl 12-hydroxystearate cracked badly during the test.

EXAMPLE 4.—INJECTION MOLDING COMPOSITION 212 parts by weight of ethyl cellulose having an ethoxy content of 46 per cent, 38 parts of 2-ethyl-hexyl 12-acetoxystearate, 95 parts of ethanol and 202 parts of benzene were mixed in a kneading type of mixer until a uniform composition was obtained. The mass was then dried to remove the alcohol and benzene. The dried material molded well in an injection press at 425° F. and a pressure of 5000 pounds per square inch. Test pieces of the composition did not crack or shatter when struck sharply at −70° C.

EXAMPLE 5.—PLASTIC FLEXIBLE AT LOW TEMPERATURES

A number of compositions consisting of ethyl cellulose having an ethoxy content of 46 per cent and of different plasticizers were prepared at 20 per cent by weight concentration in a mixture of 70 parts of toluene and 30 parts of ethanol. The amount of plasticizer ranged from 10 to 30 per cent of the ethyl cellulose. Foils approximately 0.005 inch thick when dry were cast on glass plates from each of the solutions. The dried films were conditioned for 24 hours at 21° C. in air of 50 per cent relative humidity and then cut into strips 15 millimeters wide and about 4 inches long. The strips of foil were tested on a Tinius-Olsen folding endurance tester at −50° C. The test consisted of placing a tensile load of 1.5 kilograms on the strip and bending it 200 times per minute on a short radius through an arc of 270°. The number of bends before breakage of the various films is recorded in Table 4, each value given being an average of 6 tests.

TABLE 4

*Flexibility of plasticized ethyl cellulose*

| Plasticizer | Percent plasticizer in composition | Number of bends before breakage |
|---|---|---|
| None (control determination) | | 5 |
| 2-ethyl-hexyl 12-hydroxystearate | 10 | 31 |
| Do | 20 | 35 |
| Do | 30 | 50 |
| 2-ethyl-hexyl 12-acetoxystearate | 10 | 10 |
| Do | 20 | 22 |
| Do | 30 | 30 |
| Ethyl 12-hydroxystearate | 10 | 38 |
| Do | 20 | 42 |
| Do | 30 | 45 |
| Ethyl 12-acetoxystearate | 10 | 24 |
| Do | 20 | 30 |
| Do | 30 | 45 |
| Di (o-xenyl) phenyl phosphate | 10 | 5 |
| Do | 20 | 3 |
| Do | 30 | 0 |
| Tri cresyl phosphate | 10 | 10 |
| Do | 20 | 4 |
| Do | 30 | 1 |

We claim:

1. A plasticized thermoplastic composition characterized by its high degree of flexibility and by its high resistance to impact at temperatures as low as −40° C., which includes ethyl cellulose and a compatible amount greater than 8 per cent by weight of an alkyl ester of an acid selected from the class consisting of hydroxy- and acyloxystearic acids.

2. The composition as claimed in claim 1 wherein the ethyl cellulose has an ethoxy content of from 44 to 49.5 per cent.

3. A plasticized thermoplastic composition characterized by its high degree of flexibility and by its high resistance to impact at temperatures as low as −40° C., which includes ethyl cellulose and a compatible amount greater than 8 per cent by weight of an alkyl ester of a hydroxystearic acid.

4. The composition as claimed in claim 3 wherein the ethyl cellulose has an ethoxy content of from 44 to 49.5 per cent.

5. A composition as claimed in claim 3 wherein the alkyl ester is methyl 12-hydroxystearate.

6. A composition as claimed in claim 3 wherein the alkyl ester is secondary butyl 12-hydroxystearate.

7. A composition as claimed in claim 3 wherein the ester is 2-ethyl-hexyl 12-hydroxystearate.

MELVIN J. HUNTER.
EARLE L. KROPSCOTT.